US010479130B2

(12) United States Patent
Herslow et al.

(10) Patent No.: US 10,479,130 B2
(45) Date of Patent: Nov. 19, 2019

(54) CARD WITH EMBEDDED IMAGE

(75) Inventors: John Herslow, Scotch Plains, NJ (US); Luis J. DaSilva, Bridgewater, NJ (US)

(73) Assignee: COMPOSECURE, L.L.C., Mountainside, NJ (US)

(*) Notice: Subject to any disclaimer, the term of this patent is extended or adjusted under 35 U.S.C. 154(b) by 1056 days.

(21) Appl. No.: 12/460,829

(22) Filed: Jul. 24, 2009

(65) Prior Publication Data
US 2011/0020606 A1 Jan. 27, 2011

(51) Int. Cl.
*B32B 37/02* (2006.01)
*B42D 25/46* (2014.01)
(Continued)

(52) U.S. Cl.
CPC ............... *B42D 25/46* (2014.10); *B32B 3/30* (2013.01); *B32B 15/08* (2013.01); *B32B 27/06* (2013.01); *B32B 27/08* (2013.01); *B32B 27/30* (2013.01); *B32B 27/32* (2013.01); *B32B 27/36* (2013.01); *B32B 38/06* (2013.01); *B42D 25/00* (2014.10);
(Continued)

(58) Field of Classification Search
CPC ........... B32B 3/30; B32B 27/06; B32B 27/08; B32B 27/30; B32B 27/32; B32B 27/36; B32B 37/003; B32B 37/02; B32B 38/06; B32B 38/14; B32B 38/145; B32B 2307/416; B32B 2307/418; B32B 2309/68; B32B 2425/00; B32B 2429/00; Y10T 156/1039; B42D 25/00; B42D 25/425; B42D 2033/10; B42D 2033/18;
(Continued)

(56) References Cited

U.S. PATENT DOCUMENTS 2,205,466 A * 6/1940 Caprio ................... B44C 3/085
156/219
4,354,851 A 10/1982 Hix et al.
(Continued)

FOREIGN PATENT DOCUMENTS

EP 0368570 A2 5/1990
JP 2002260290 9/2002
(Continued)

OTHER PUBLICATIONS

Final Office Action for U.S. Appl. No. 14/183,868, dated Mar. 9, 2018, 29 pages.
(Continued)

Primary Examiner — Philip C Tucker
Assistant Examiner — John Blades
(74) Attorney, Agent, or Firm — RatnerPrestia

(57) ABSTRACT

The invention includes a method for forming a card with an embedded three dimensional (3-D) image and the resultant card formed by the method. The method includes forming a first assembly which includes a layer of deformable material and an overlying layer of pattern conforming material. An engraved laminating plate is applied to the deformable layer during an engraving and laminating step applied to the first sub-assembly under predetermined pressure and selected temperature conditions for embossing the deformable layer with a well defined and sharp pattern. Then, a second assembly including a pattern conforming layer is laminated with the first assembly to embed and secure the pattern between the two conformable layers.

14 Claims, 8 Drawing Sheets

(51) Int. Cl.

| | | |
|---|---|---|
| *B32B 3/30* | (2006.01) | |
| *B32B 15/08* | (2006.01) | |
| *B32B 27/06* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *B32B 38/06* | (2006.01) | |
| *B42D 25/425* | (2014.01) | |
| *B42D 25/00* | (2014.01) | |
| *B32B 37/00* | (2006.01) | |
| *B32B 38/14* | (2006.01) | |
| *B32B 38/00* | (2006.01) | |
| *B42D 25/45* | (2014.01) | |
| *B42D 25/328* | (2014.01) | |

(52) U.S. Cl.
CPC .......... *B42D 25/425* (2014.10); *B32B 37/003* (2013.01); *B32B 37/02* (2013.01); *B32B 38/14* (2013.01); *B32B 38/145* (2013.01); *B32B 2307/416* (2013.01); *B32B 2307/418* (2013.01); *B32B 2309/68* (2013.01); *B32B 2425/00* (2013.01); *B32B 2429/00* (2013.01); *B42D 25/328* (2014.10); *B42D 25/45* (2014.10); *B42D 2033/10* (2013.01); *B42D 2033/18* (2013.01); *B42D 2033/20* (2013.01); *B42D 2033/24* (2013.01); *Y10T 428/24529* (2015.01)

(58) Field of Classification Search
CPC ............ B42D 2033/20; B42D 2033/24; B42D 25/455; B42D 25/46
USPC ....... 156/196, 199, 205, 206, 209, 210, 219, 156/220, 228, 306.3, 308.2, 309.6, 309.9, 156/580, 583.1, 242–246, 221; 428/161, 428/162, 163, 164, 209, 212, 213, 214, 428/215, 216, 380, 488, 490, 916, 336.38; 235/380, 488, 490; 264/1.31, 1.34; 283/94, 107, 109
See application file for complete search history.

(56) References Cited

U.S. PATENT DOCUMENTS

| | | | |
|---|---|---|---|
| 4,456,639 A | | 6/1984 | Drower et al. |
| 4,499,126 A | * | 2/1985 | Suzuki et al. .................. 428/13 |
| 4,579,754 A | | 4/1986 | Maurer et al. |
| 4,711,690 A | * | 12/1987 | Haghiri-Tehrani ........ 156/309.6 |
| 4,728,377 A | * | 3/1988 | Gallagher ........................ 156/58 |
| 4,747,901 A | * | 5/1988 | Becker .................. B29C 59/026 156/220 |
| 4,856,857 A | | 8/1989 | Takeuchi et al. |
| 4,971,646 A | * | 11/1990 | Schell et al. ............. 156/244.17 |
| 5,316,791 A | | 5/1994 | Farber et al. |
| 5,492,370 A | | 2/1996 | Chatwin et al. |
| 5,804,285 A | * | 9/1998 | Kobayashi et al. .......... 428/172 |
| 5,895,909 A | | 4/1999 | Yoshida |
| 6,066,437 A | | 5/2000 | Kosslinger |
| 6,364,983 B1 | * | 4/2002 | Kay ............................... 156/230 |
| 6,581,839 B1 | * | 6/2003 | Lasch et al. ................... 235/487 |
| 6,644,552 B1 | * | 11/2003 | Herslow ....................... 235/488 |
| 7,029,547 B2 | * | 4/2006 | Biller ............................ 156/219 |
| 7,059,534 B2 | | 6/2006 | Takahashi |
| 7,287,704 B2 | | 10/2007 | Herslow |
| 7,503,503 B2 | * | 3/2009 | Riedl et al. ................... 235/488 |
| 8,672,232 B2 | | 3/2014 | Herslow |
| 8,944,810 B2 | | 2/2015 | Herslow |
| 9,016,591 B2 | | 4/2015 | Herslow et al. |
| 9,390,363 B1 | | 7/2016 | Herslow et al. |
| 9,390,366 B1 | | 7/2016 | Herslow et al. |
| 9,542,635 B2 | | 1/2017 | Herslow |
| 9,569,718 B2 | | 2/2017 | Herslow |
| 2002/0014297 A1 | | 2/2002 | Mott et al. |
| 2002/0015897 A1 | * | 2/2002 | Toshine ............... G03H 1/0252 430/2 |
| 2006/0172136 A1 | | 8/2006 | Komori et al. |
| 2008/0309064 A1 | * | 12/2008 | Herlin ...................... B42C 5/00 156/322 |
| 2009/0169776 A1 | | 7/2009 | Herslow |
| 2009/0315316 A1 | | 12/2009 | Staub et al. |
| 2010/0230154 A1 | | 9/2010 | Naito et al. |
| 2015/0136856 A1 | | 5/2015 | Herslow et al. |
| 2015/0206047 A1 | | 7/2015 | Herslow et al. |
| 2015/0339564 A1 | | 11/2015 | Herslow et al. |
| 2016/0180212 A1 | | 6/2016 | Herslow et al. |

FOREIGN PATENT DOCUMENTS

| | | |
|---|---|---|
| KR | 1020040104545 | 12/2004 |
| WO | 2016073473 A1 | 5/2016 |

OTHER PUBLICATIONS

Non Final Office Action for U.S. Appl. No. 15/356,586, dated Apr. 2, 2018, 34 pages.
European Communication for EP Application No. 14752098.5, dated Jan. 16, 2018, 3 pages.
Notice of Allowance for U.S. Appl. No. 14/977,553, dated Oct. 20, 2017, 13 pages.
Non Final Office Action for U.S. Appl. No. 14/178,436, dated Nov. 29, 2017, 24 pages.
Non Final Office Action for U.S. Appl. No. 15/637,092, dated Nov. 1, 2018, 48 pages.
Non Final Office Action for U.S. Appl. No. 15/355,018, dated Oct. 29, 2018, 30 pages.
Final Office Action for U.S. Appl. No. 15/356,586, dated Sep. 13, 2018, 22 pages.
Non Final Office Action for U.S. Appl. No. 14/178,436, dated Oct. 4, 2018, 23 pages.
Non Final Office Action for U.S. Appl. No. 14/183,868, dated Sep. 27, 2018, 16 pages.

* cited by examiner

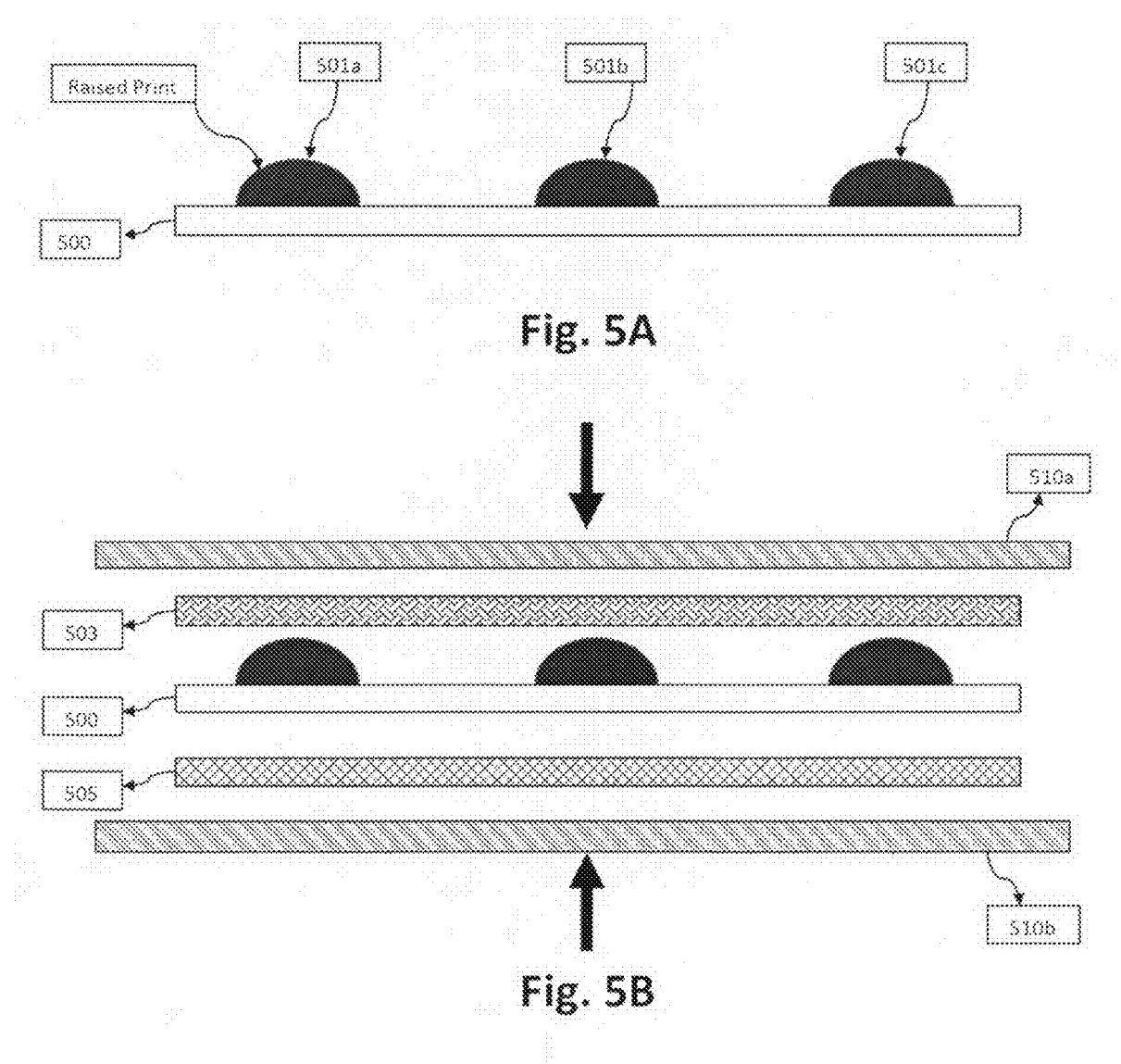

CARD WITH EMBEDDED IMAGE

BACKGROUND OF THE INVENTION

The invention relates to the manufacture of a multi-layered (composite) card, or any like instrument or document.

The term "card" or "cards" as used herein, and in the appended claims, is intended to include a large variety of documents and instruments such as transactional (financial) cards, identification (including a National ID or Driver's License) cards, electronic passport pages, gift cards, documents for holding permanent and long lasting records such as medical records or security cards, or other plastic cards used for promotion of a product or organization.

A known scheme for providing a card with an image includes a screen printed image and the use of clear ultra violet (UV) cured screen printing to create a depression of the metallic foil during lamination. A process for making such a card and some of the features of such a card is illustrated with respect to FIG. 5. As shown in FIG. 5, a deformable metal layer 500 may have a pattern (501a, 501b) formed on the back (top surface in FIG. 5) surface of layer 500. Due to the nature of the screen print material, the printed pattern will consist of various domed-like elements (501a, 501b) distributed on the top surface of layer 500 with the dome like elements having a cross section which appears generally like a semicircle. To form an image on the front side of the layer 500, at least one layer 503 of non-conformable material is positioned over (in back of) the printed pattern and a layer 505 of conformable material is placed in front (below in FIG. 5) of the deformable layer 500. A sandwich is thus formed comprising of a non-conformable layer 503, a patterned region 501, a deformable layer 500 and a conformable layer 505. The sandwich is then laminated by the application of lamination plates 510a and 510b above and below the sandwich layers. The lamination plates apply a predetermined temperature and pressure to the sandwich to cause the transfer of the pattern onto the deformable layer 500. A card formed in accordance with the prior art will have the features shown in FIG. 5C. The domed pattern (501a, 501b) is transferred to the deformable layer 500 and the conformable layer 505. There is distortion (spread) of the pattern during the transfer since the print pattern is being forced into the deformable layer and the underlying conformable layer. Nevertheless, the domed pattern (501a, 501b) will cause a corresponding embossment (protuberance) extending along the outer surface of layer 500.

However, as shown in FIG. 5C, only rounded edges can be formed with this process, preventing the formation of a sharp detailed pattern. [This will typically "distort" almost all of the thickness of the screen print (typically around 0.0005 inches).] The resulting pattern using screen printing is not very sharp. This is shown in FIG. 5C which illustrates the reason for the lack of sharpness. Print material may be deposited (raised print) on a foil layer. The print material will typically have a rounded distribution. When a laminating plate is applied to the raised print layer it will push the foil outward (downward in FIG. 5) and create an embossment on the opposite side of the foil layer. However, this embossment does not have sharp edges and a resulting image will not be clear and well defined.

It is an object of the invention to manufacture a card formed with materials having certain "flow" characteristics as a function of temperature to enable a clear, well defined, 3-D image to be produced within the card.

It is another object of the invention to manufacture an embossed card whose top and bottom surfaces are flat and with reduced internal surface imperfections.

SUMMARY OF THE INVENTION

A method for making a card embodying the invention includes the steps of forming a first assembly which includes a layer of deformable material with a first layer of conforming material overlying the deformable layer. During an engraving and laminating step, an engraved laminating plate, engraved with a desired pattern, is applied to the deformable layer and a uniformly flat laminating plate is applied to the other side of the first assembly. During this step, sufficient pressure and heat are applied to the first assembly to emboss the deformable layer with the desired pattern and to cause a flow of material from the overlying conformable layers to fill the "depressions" in the deformable layer. A very fine and well defined three dimensional pattern is thus transferred to, and set into, the deformable layer. Then, a second assembly including a second layer of highly conforming material placed in contact with the embossed deformable layer is laminated with the first assembly. As a result, the deformable layer and its embossed image is set and embedded between the two conformable layers.

Generally, the lamination of the first and second assemblies is conducted at a lower temperature than the lamination of the first assembly so as to not soften the first conformable layer and hence disturb the fixed image formed on (and in) the deformable layer.

The first assembly may include additional layers of conformable and leveling materials formed above (in back of) the deformable layer; and the second assembly may, likewise, include additional layers of conformable and leveling materials formed below (in front of) the deformable layer. This may be done to produce a card whose top and bottom surfaces are uniformly flat To produce a visible image, the deformable layer and the overlying and underlying layers laminated with the deformable layer may be selected to have contrasting colors and/or different refractive indices including optically reflective material. A very fine and well defined three dimensional pattern is thus transferred to, and set into, the deformable layer.

The deformable layer may be of any suitable material adapted to be embossed and to retain the imparted shape. Thus, the deformable layer may be metallic (e.g., a foil) or any other suitable non-metallic material.

The deformable layer and its associated underlying and overlying layers may be selected to have different refractive indices and printed sections to control the image seen looking at the front of the card or the back of the card.

A card embodying the invention includes a layer of deformable material (e.g., a foil layer) embedded between two layers of conformable material with the layer of deformable material being embossed to create a sharp, well defined, three dimensional (3-D) image. The embossed pattern includes generally rectilinear shapes. That is, the embossed pattern is shaped to have straight lines which are generally perpendicular, or orthogonal, to each other. Additional layers may be formed above and below the two conformable layers to form a card whose top and bottom surfaces are uniformly flat The card (or document) can be a standard transaction card, sized as per ISO 7810, or it can be of any other size, i.e., it can be larger, smaller, thinner or thicker.

An embodiment of the invention includes: (a) forming a first assembly which includes a layer of deformable material with a first layer of conforming material overlying the deformable layer and a first set of additional semi conforming and leveling layers overlying layer the first layer; (b) engraving the layer of deformable material and laminating the first assembly for embossing a pattern onto the deformable layer at a relatively high temperature (e.g., 300 degrees Fahrenheit); and (c) forming a second assembly which includes a second layer of conforming material underlying the deformable layer and a second set of additional semi conforming and leveling layers underlying (and being in front of) the second layer and laminating the second assembly with the first assembly at a lower temperature (e.g., 280° F.) to not disturb (re-soften) the embossed pattern.

BRIEF DESCRIPTION OF THE DRAWINGS

In the accompanying drawings, which are not drawn to scale, like reference characters denote like components, and:

FIGS. 5, 5A, 5B and 5C are conceptual cross sectional view illustrating a prior art method of forming a pattern on a card.

DETAILED DESCRIPTION OF THE INVENTION

Figure 1:
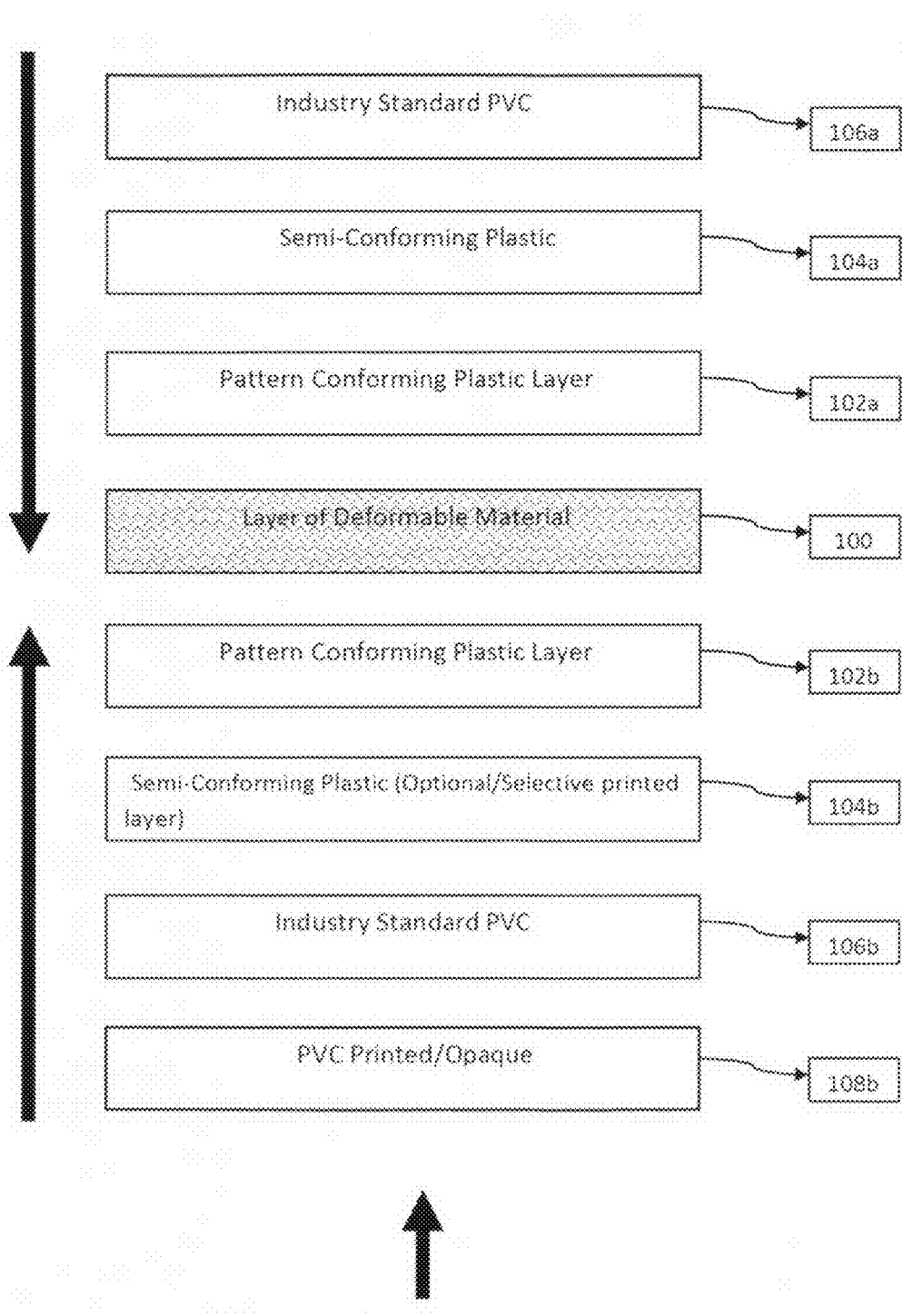
FIG. 1 is an idealized symbolic cross-sectional view of the layers of a card embodying the invention.

FIG. 1 shows the structure of a card embodying the invention which projects a three dimensional (3-D) image or pattern while actually having uniformly flat top and bottom external surfaces. A layer 100, embedded between two layers 102a and 102b of conformable material, is embossed with a desired pattern. A layer 102a of conforming material is formed above layer 100 and a layer 102b also of conforming material is formed below layer 100. The layer 100 is formed of a material which is deformable and malleable. The material of layer 100 may be metallic (e.g., a foil) or any other suitable non-metallic material having a sufficiently high reflective or refractive index to enable the formation and display of a well defined optical contrasting image. The deformable embedded layer 100 can be plain metal, holographic (including HRI), registered holographic, dyed in color, printed, or any combination of the above. To produce a visible image, the deformable layer and the overlying and underlying layers laminated with it are selected to have contrasting colors and/or different refractive indices, including optically reflective material. The layer 100 is generally very thin (e.g., microscopic). For example, it may range in thickness from 0.0005 inches to 0.003 inches. The layer 100, when engraved, may have a pronounced and patterned three dimensional (3-D) image produced in accordance with this invention. The 3-D image which may be purely decorative can be either clear or opaque. The laminated card will have uniform and flat top and bottom surfaces.

The layers 102a and 102b are formed of pattern conforming material which, in this context, means that the material of these layers when placed under appropriate selected temperature and pressure will "flow" (or deform) readily to conform and adhere to the pattern embossed in the embedded layer 100 while providing a leveling effect on the side of layers 102a, 102b facing away from the embossed layer 100. After the layers 102a and 102b are made to conform to the embossed layer they will remain set to the shape unless the selected temperature is exceeded. Thus, any material having these properties may be used as layers 102a, 102b to practice the invention. Some typical materials used to practice the invention include, but are not limited to, polyvinyl chloride (PVC), amorphous polyester terepthalate (PET) including PETG, polyethylene or any thermo plastic material. The thickness of layers 102a, 102b, may range from less than 0.002 inches to more than 0.008 inches. Layers 102a, 102b may also be referred to as adhesive layers since they are designed to adhere to the deformable patterned layer 100.

Then, there is a layer 104a of semi-conforming material formed above (in back of) layer 102a and a layer 104b also formed of semi-conforming material below (in front of) layer 102b. Layers 104a and 104b provide similar filling (conforming) and leveling and adhering functions to those provided by layers 102a and 102b. However, layers 104a, 104b need not be as conformable as layers 102a, 102b. Some typical materials used to practice the invention include PVC, PET, PE [provide full names]. The thickness of layers 104a, 104b, may range from less than 0.001 inches to more than 0.012 inches.

As shown in FIG. 1, the semi-conforming 104b layer may include preprinted data or a printed layer. The printed layer may be used to mask or block portions of the 3-D pattern formed on layer 100.

Then there is a standard PVC layer 106a formed above (in back of) the semi-conforming layer 104a and a similar standard PVC layer 106b formed below (in front of) the semi-conforming layer 104b.

Note that there is a high degree of symmetry in the formation of layers 102a, 102b, 104a, 104b, 106a and 106b above and below layer 100 so that warping and distortion of the card due to environmental responses of the various layers is limited. Also, as the card is formed (see below) the top surface of layer 106a and the bottom surface of layer 106b tend to be uniformly flat.

FIG. 1 also shows a PVC layer 108b formed below (in front of) layer 106b. Layer 108b may include printed data and may be opaque or transparent. The pattern embossed on, or within, layer 100 can be read/seen from the bottom (front) side as shown in FIG. 1. It should be understood that the terms above ("a") and below ("b") as used herein are purely arbitrary and applied for ease of illustration and explanation. The explanation applies equally if the drawings and the card are inverted 180 degrees.

Figure 2:
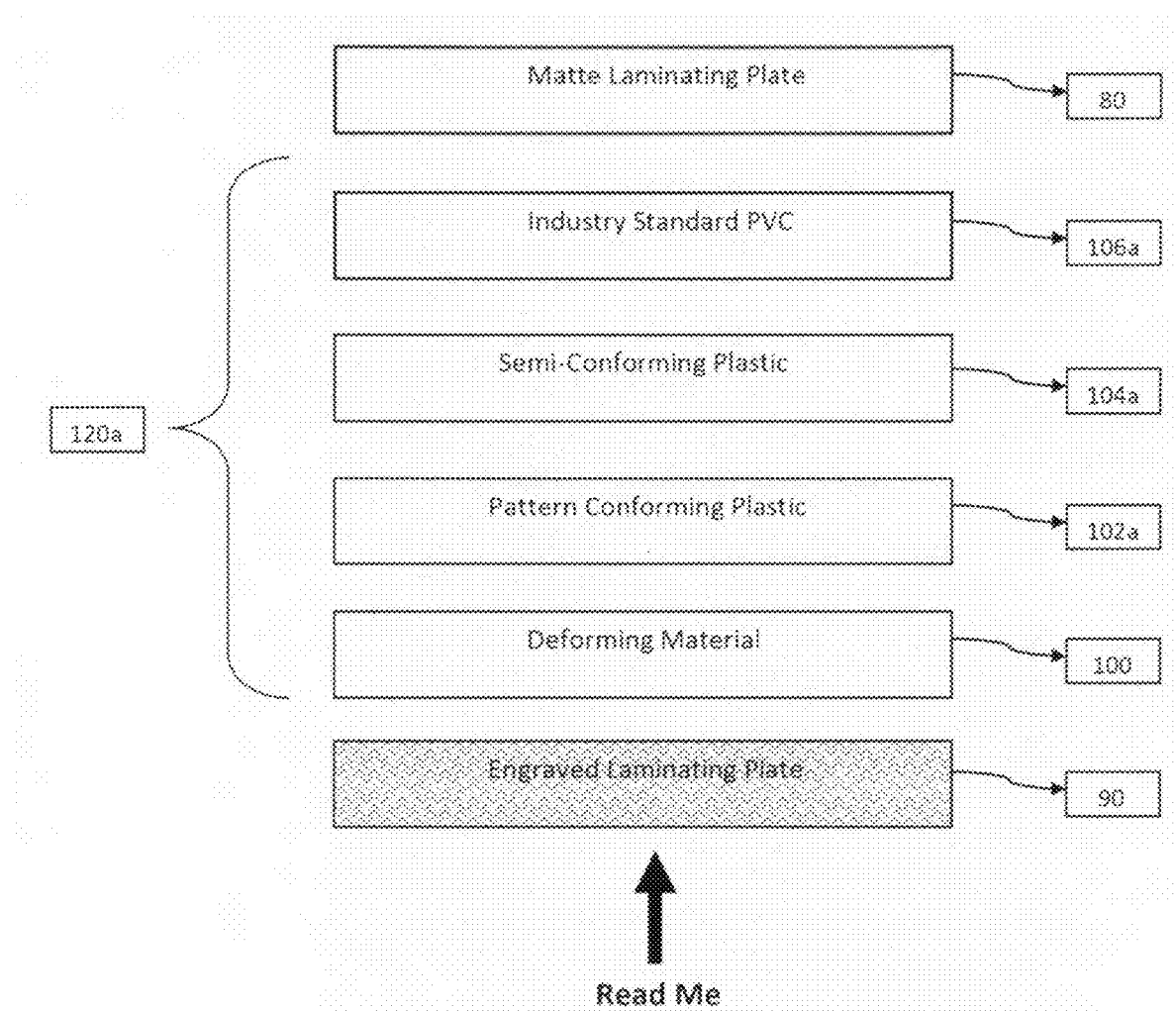
FIG. 2 is an idealized symbolic cross-sectional diagram of layers and associated components used to form one portion (e.g., the upper portion) of a card embodying the invention.
Figure 3:
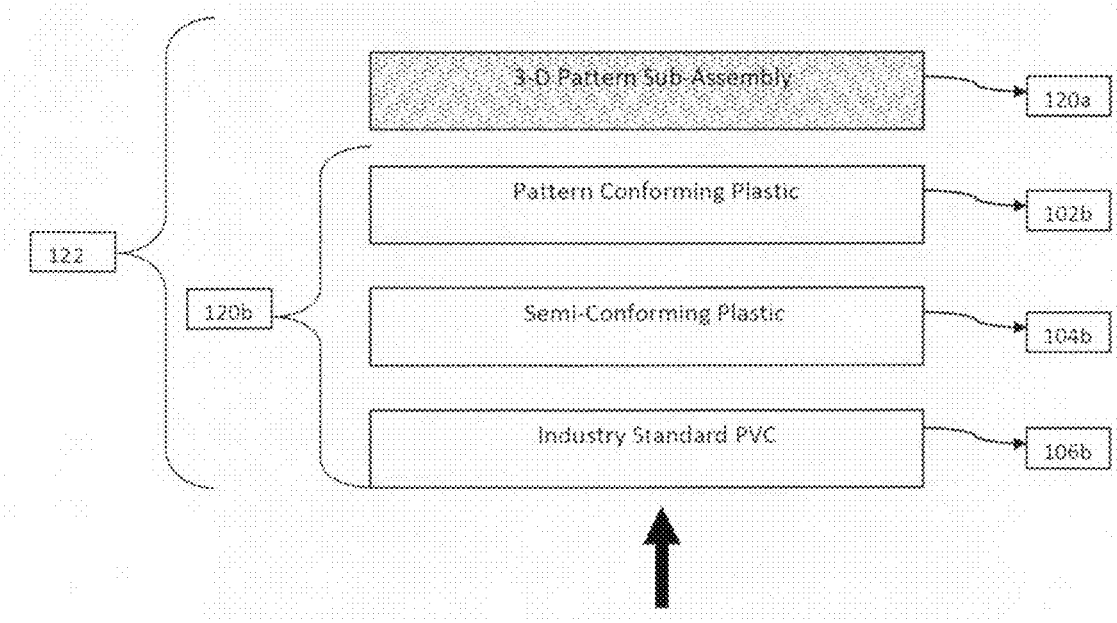
FIG. 3 is a simplified cross-sectional view of layers used to form another portion (e.g., the lower portion) of a card embodying the invention.
Figure 4:
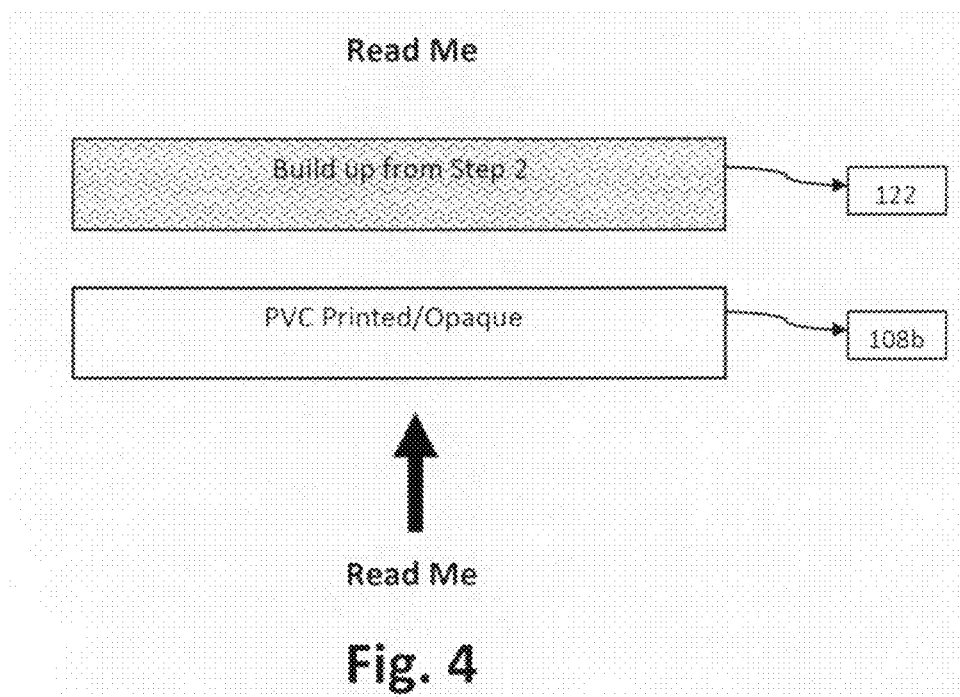
FIG. 4 is an idealized cross-sectional view of additional layers which may be added to the layers shown in FIG. 3.
Figure 5:
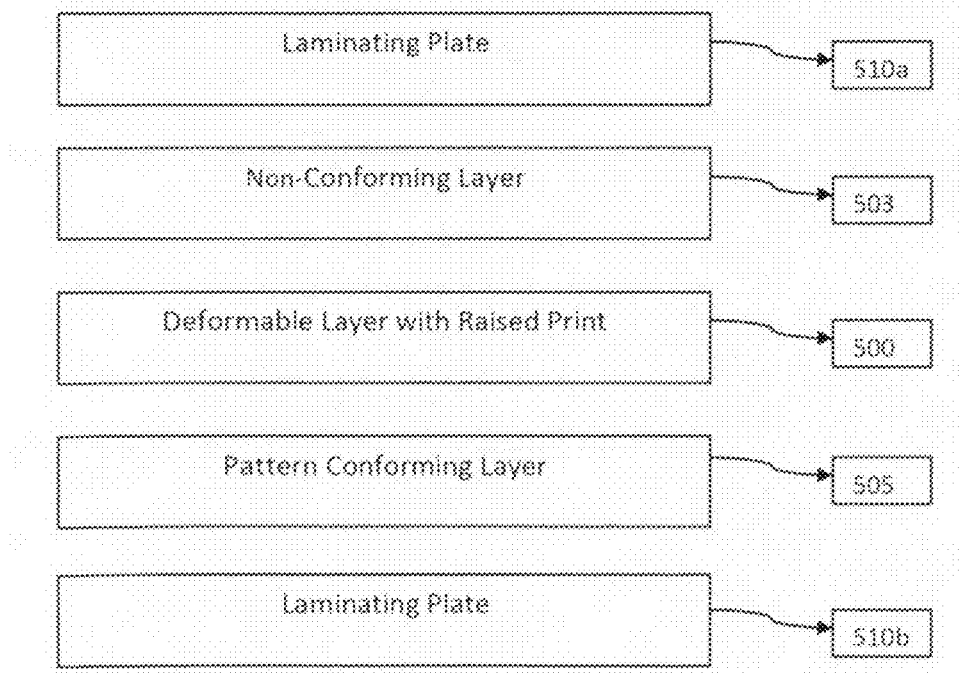
Figure 5C:
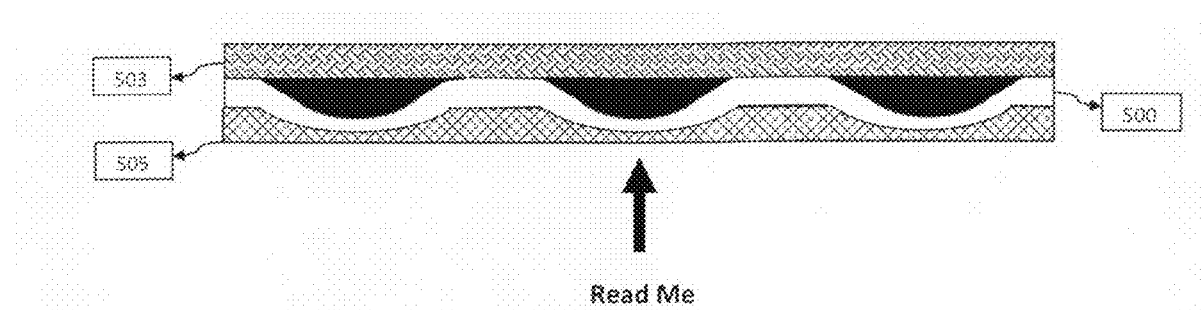

The card shown in FIG. 1 may be formed in two (or more) laminating steps as detailed in FIGS. 2, 3 and 4. FIG. 2 illustrates that a first assembly 120 is formed comprising a layer 100 of deformable material overlying which is a layer 102a of conformable material overlying which is layer 104a of semi-conformable material 106a. The assembly or sandwich 120 is also arbitrarily referred to as the "top" (back) portion 120 of the card, the first assembly and/or the build up 120a. The assembly 120a is embossed and laminated as discussed below.

An engraved laminating plate 90 is chemically etched with a pattern. The plate 90 may also be laser etched or engraved by any number of known mechanical or electrical means. Thus a step in the process includes preparing an engraved laminating plate, 90, engraved with the desired pattern to be transferred to the card.

Assume that the deformable layer 100 is a foil layer and that the engraved laminating plate is applied to the bottom (front) side of foil layer 100 (as shown in FIGS. 1 and 2) to generate an embossed pattern on, and within, the foil layer 100 facing towards the front of the card (i.e., the embossed pattern will be facing towards the "Read Me" side shown in FIG. 2

Figure 2A:
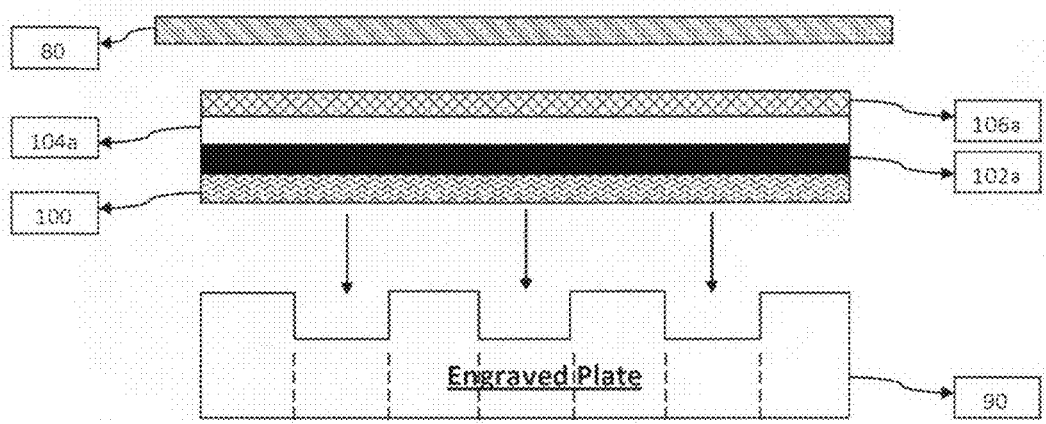
FIG. 2A is an idealized cross-sectional diagram of a lamination process in accordance with the invention.
Figure 2B:
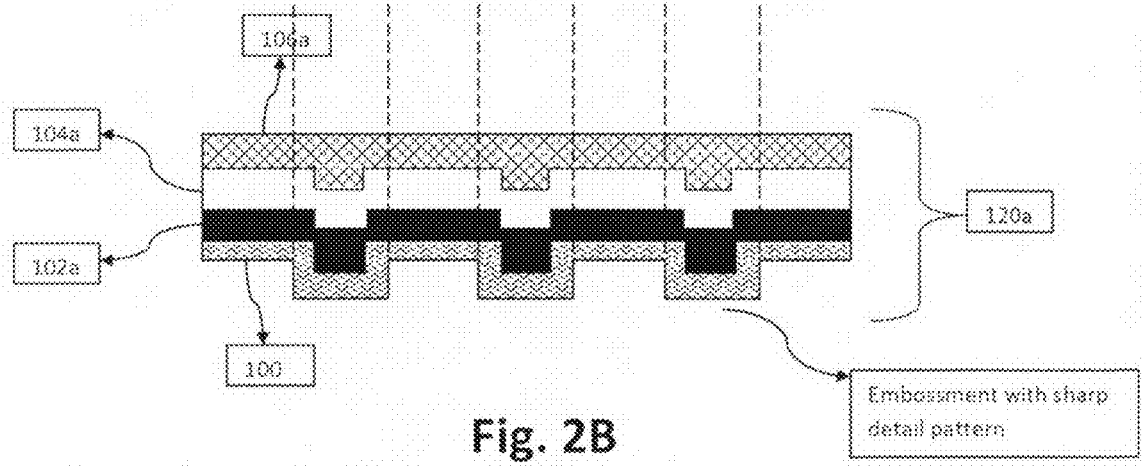
FIG. 2B is a simplified cross sectional diagram illustrating the raised (embossed) pattern formed on and within (or extending from) the outer surface of the foil layer 100 and the overlying (back) layers.

FIGS. 2, 2A, and 2B, illustrate the formation of a first assembly or sandwich 120a comprised of the following four layers:
  i—a (holographic) foil layer (e.g., 100) of a (highly) deformable material to be placed against the engraved laminating plate 90 to form an embossed pattern on the foil layer, 100;
  ii—a first layer 102a of a pattern conforming plastic material placed above (in back of) the foil layer (e.g, 100);
  iii—a first additional layer 104a of a semi-conforming material placed above the layer 102a; where layer 104a may be clear or opaque; and
  iv—A standard PVC layer 106a placed above layer 104a.

The layers 100, 102a, 104a, and 106a, forming assembly 120a, are placed between the engraving laminating plate 90 and a matte laminating plate 80 with the front surface of foil layer 100 facing the engraving plate 90. Plates 80 and 90 function as opposing lamination plates across sandwiched layers 120a. The foil layer 100 is embossed with the engraved pattern and the layers 100, 102a, 104a and 106a are laminated at the same time by the application of heat and pressure to the subassembly 120a. During the lamination and engraving processing step of the first assembly 120a, laminating plate 80 and engraving laminating plate 90 are used to engrave layer 100 and to apply heat and pressure to the intermediate layers 102a, 104a and 106a to soften the materials constituting the layers and to reduce their respective viscosities.

Applying pressure and heat to assembly 120a causes the metallic foil layer 100 to be forced (pressed) into the engraved cavities in the laminating plate 90 to conform to the desired engraved pattern. Concurrently, material from conformable layer 102a and semi-conformable layer 104a flow into, and fill, the cavities (embossments) imparted to the foil layer 100 by, and with, the engraving plate 90. Concurrently, the layers 102a, 104a and 106a combine to provide leveling for the top surface of layer 106a of assembly 120a. The top surface of layer 106a may thus be uniformly level. Thus, when the engraved laminating plate 90 (and the laminating plate 80) is removed, an embossed pattern may be fixed into the layer 100 and set into the front of the assembly, as shown in FIG. 2B A matte finished laminating plate 80 is used to prevent air bubble entrapment which may result from the use of "polished" plates. When a matte finish is used, any air entrapped by (and or between) the surfaces of the polished plate and the surface of the plastic being laminated leaves via "valleys" produced in a "matted" surface. Alternatively, A vacuum laminator may be used to suck out the air that causes bubbles eliminating the need to use matte plates or allowing the use of polished plates.

In FIGS. 2, 2A and 2B, the engraved laminating plate 90 is shown positioned below the layer 100 and is applied during the engraving and lamination of the first assembly 120a to the bottom (front) side of layer 100. After lamination, the resultant sheet containing assembly 120a will have an embossed pattern protruding towards the bottom in the figures which corresponds to the front of the card (the "Read Me" side). As discussed, layers 102a and 104a are selected to have properties which will cause them to provide filling material in the raised embossment (protrusions) formed in layer 100 during engraving and lamination. Concurrently layer 106a in combination with layers 102a and 104a function to complete the filling process and provide a uniformly flat surface above 106a. The total thickness of the build up (or top assembly) 120a may be in the range of 0.004" to 0.015" for an ISO card. However, it should be evident that the thickness of the top assembly 120a may be less or significantly greater.

The build up (or top assembly) 120a is formed at a relatively high temperature and pressure to cause the material of the deformable layer 100 to be malleable and engravable by engraving plate 90 and the material of layer 102a (and of layer 104a) to flow into the embossed regions engraved into layer 100. By way of example, in one embodiment the lamination of layers 100, 102a, 104a and 106a to form a first assembly 120a was done at a platen temperature of 300 degrees Fahrenheit and a pressure of 350 PSIA. [Note these are given for purpose of illustration and a wide range of temperature and pressure may be used where appropriate for the materials used.] In one embodiment of the invention, the thickness of the various layers was approximately as follows: the foil layer 100 was 0.002 inches, the conforming layer 102a was 0.003 inches, the semi-conforming (white) leveling layer 104a was 0.0065 inches, and the over lying PVC clear laminate layer 106a was 0.002 inches, whereby the build up 120a was approximately 0.0135 inches.

FIGS. 2A and 2B are intended to illustrate that during the lamination process layer 100 will deform to conform to the shape/pattern of the engraved plate 90 and layer 102a will melt and press down on, and within, layer 100 to ensure that that the engraved pattern is transferred to and set in layer 100 and in layer 102a in back of layer 100. This step is critical in the creation of a sharp detailed pattern in the foil layer 100 and is in sharp contrast to known schemes.

FIG. 2B illustrates that at the end of the first stage of lamination, (also referred to as step 1) an assembly 120 is formed containing an embossed pattern formed within the foil layer 100 which is, essentially, a raised 3-D image. This image has very sharp and well detailed lines and is shown to protrude toward the bottom of the page in FIG. 2B (the front of the card). By proper selection of the materials constituting layers 102a, 104a and 106a the outer (upper) surface of layer 106a, after lamination, is smooth and uniformly flat. It is significant to note that, in accordance with invention, the embossed pattern may be termed to be "rectilinear" in that the pattern is formed with straight lines which are generally perpendicular to each other. Note that the rectilinear condition extends to the portion of layer 102a most directly in contact with patterned layer 100.

Figure 2C:
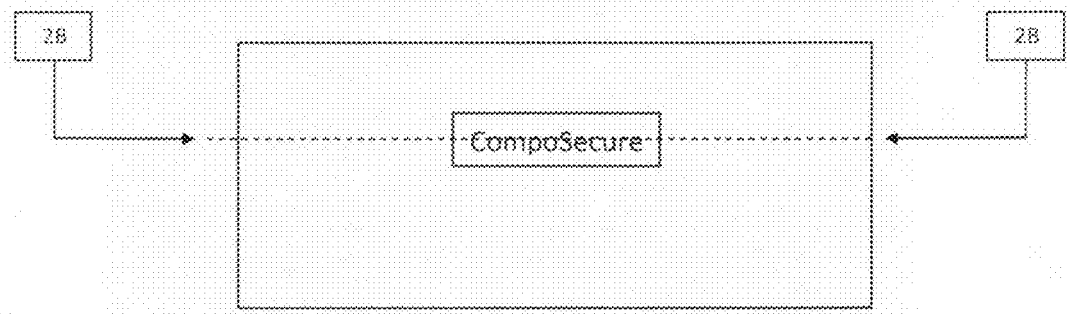
FIG. 2C is a top view of a card showing a pattern formed following the application of an engraving plate during a lamination process as set forth in FIGS. 2, 2A and 2B.

FIG. 2C illustrates a possible pattern (e.g., "CompoSecure") created by the application of the engraved plate 90 to the assembly 120a and subjecting the assembly 120a to the relatively high temperature and pressure described above. This illustrates that the resulting card will have a sharp, well defined, image formed on the outer surface of embossed layer 100.

In accordance with the invention, the appearance of the image and its 3D quality formed on, and in, layer 100 of sub-assembly 120a is secured and preserved by the addition of an additional assembly 120b as shown in FIG. 3. However, the lamination of sub-assemblies 120a and 120b is conducted at a lower temperature than the temperature used to laminate 120a to prevent the softening of layer 102a and the disturbance of the embossed pattern.

Figure 3A:
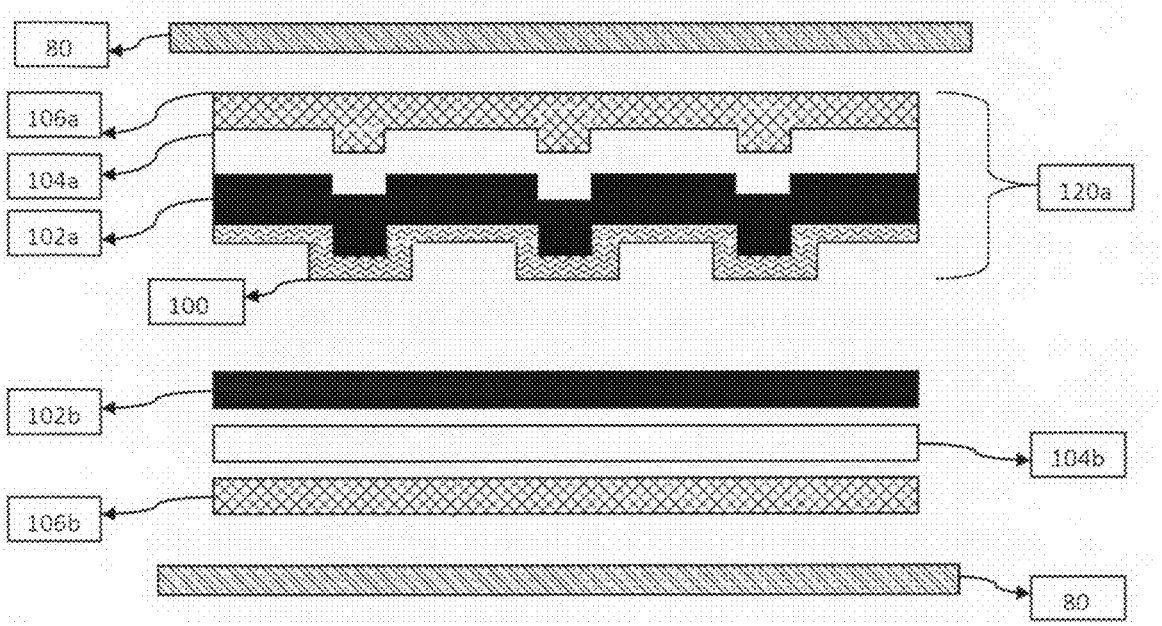
FIG. 3A is an idealized cross-sectional diagram of the stacking and lamination of upper and lower assemblies in accordance with the invention.
Figure 3B:
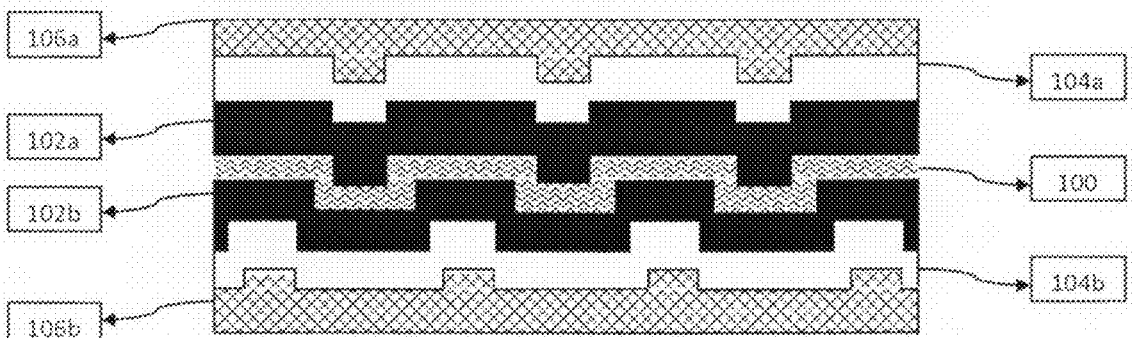
FIG. 3B is an idealized cross-sectional diagram of an embossed layer embedded between conforming layers in accordance with the invention.

FIGS. 3 and 3A shows the formation of a "bottom or front portion" also referred to as the second assembly 120b, of a card. In FIGS. 3 and 3A, layers 102b, 104b and 106b are positioned in layers below (in front of) the embossed layer 100 and then laminated onto the bottom (front) surface of section 120a. Layer 102b may be similar to layer 102a; layer 104b may be similar to layer 104a; and Layer 106b may be similar to layer 106a. Layer 102b is of a pattern conforming material so as to conform to the pattern embossed on layer 100. Laminating plates 800 and 802 are used to apply heat and pressure to the combined assemblies 102a, 102b, as shown in FIG. 3A, to laminate the two assemblies to form a card product 122 with an embedded pattern between conforming layers 102a and 102b. Following lamination of the two assemblies, a resultant product is shown in FIG. 3B.

Note that the pattern embossed on the first assembly functions to define the pattern to which the second assembly conforms. Note also that, generally, less pressure and a lower temperature is used during the lamination step for combining assemblies 120b and 120a than during the lamination step forming the top assembly 120a. This is done in order to avoid deforming the 120a assembly and adversely affecting the integrity of the embossment.

Layer 104b is of a semi-conforming material similar to layer 104a. Layer 104b (or layer 106b) can be patterned or printed to create a mask or window to allow the display of part or all of the overlying (or underlying) embossment (image or pattern). Alternatively, layer 104b (or 106b) can be entirely clear to allow the projection and display of the entire area of the embedded and embossed layer 100. For the embodiment shown in FIG. 3, the embossed pattern will face the card side labeled "Read Me". As noted above, after the lamination steps the outer surfaces of layers 106a and 106b will be smooth and uniformly flat. Laminating plates 800a and 800b may both be polished finished laminating plates to provide a final finished polish. The fully assembled product 122, (which may be used as a card, or part of a card, embodying the invention) has the desirable features that its embossed pattern is embedded between two conforming layers which ensure the setting, protection and maintenance of the embossed pattern. The embossed pattern provides a well defined and very precise three dimensional (3-D) image because of the use of engraved plates to form the pattern. It should be appreciated as already noted above, that the embossed pattern may be termed to be "rectilinear" in that the pattern is formed with straight lines which are generally perpendicular to each other. Note that the rectilinear condition extends to the portions of layer 102a and 102b most directly in contact with patterned layer 100. The presence of these straight lines helps produce well defined images. The resulting images may be, for example, lines, type, logos, and reliefs and have any possible shape.

FIG. 4 shows the addition of a layer 108b to the front of (and underlying) layer 106b. Layer 108b may be a PVC layer with printed data and or it may be opaque. The embossed image can be seen from the front side (e.g., Read Me) and the "debossed" image can be seen from the back side if the materials in back of layer 100 are clear. The lamination of layer 108b to the assembly 122 can take place at temperatures comparable to those used to laminate assembly 120a to assembly 120b. However, the pressure exerted will be slightly higher than that exerted in the lamination of 120a to 120b. As in that process, a polished finished laminating plate may be used to obtain a flat polished surface. Note that in accordance with the invention, any of the layers may be printed or preprinted to cover any desired portion of the surface area of a layer. This enables selected portions of the image to be displayed.

Alternatively, layer 108b can be attached to layer 106b during the formation of assembly 102b and its attachment to assembly 102a. However, doing that results in a slight loss of clarity because lamination of both sides at once can cause material flow in both perpendicular directions causing the image to flow back (tend to revert to its "original" flatness).

It should be noted that a colorant may be added to the recesses of the engraving plate such that there is an optical contrast on the raised portion of the deformed image. The colorant may be introduced by any known means. For example, this can be done by wiping the surface of the engraving plate with a colorant like powdered PVC or ink and cleaning off the excess with an absorbent medium like a rag.

A card embodying the invention may thus be formed which meets the ISO standards and/or any desired shape or thickness.

Features of the invention include finding and defining those materials having the desired flow characteristics as a function of temperature:

1—In accordance with the invention, maintaining a sharp edge at the depression of the laminating plate in addition to controlling the product dimensional location on the sheet (to match printed images) are both crucial to having acceptable finished product quality.

2—Maintaining a sharp edge at the depression of the laminating plate in addition to controlling the product dimensional location on the sheet (to match printed images) are both crucial to having acceptable finished product quality.

3—Maintaining card flatness—Whenever a plastic material is platen laminated it shrinks. Doing several lamination steps of one side and then the other side can result in the first side shrinking more than the second side and loss of flatness of the card (e.g., bowing). By symmetrical construction of layers above and below the deformable layer and by appropriate selection of materials this problem is minimized.

4—Minimizing internal surface imperfections. Because air can be trapped by crevices, which will be filled by flowing plastic, air bubbles inside the lamination surfaces can be generated. Adjusting the lamination cycles to overcome this problem can be challenging.

Figure 6:
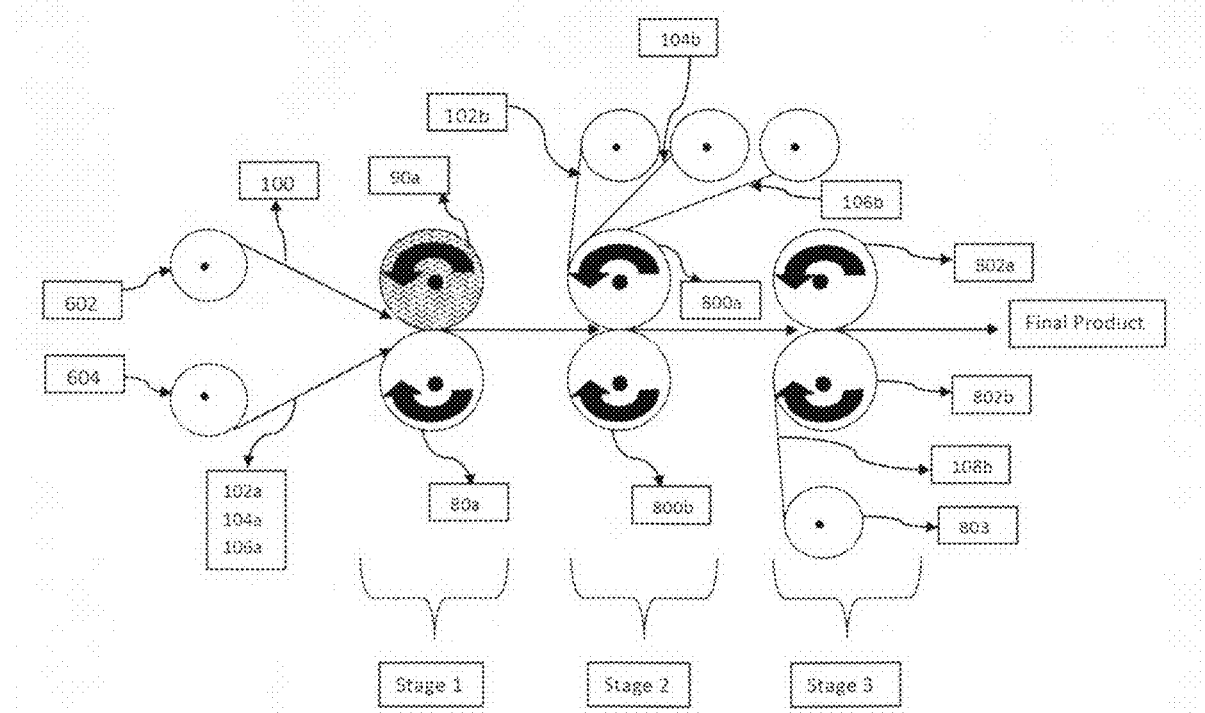
FIG. 6 is a highly simplified diagram of a continuous system using rollers to make cards in accordance with the invention.

FIG. 6 shows the use of rollers (rotating drums) to form card products embodying the invention. A sheet of deformable material corresponding to layer 100 is wrapped around a roller 602 and sheets of material corresponding to layers 102a, 104a and 106a are stacked one on top of the other and wrapped around a roller 604. The sheet of deformable material and the stacked sheets of conforming and leveling materials are pressed against each other as they are urged through and pass between engraving roller 90*a* and laminating roller 80*a*. Engraving roller 90*a* functions like engraving plate 90 and laminating roller 80*a* functions like laminating plate 80. Rollers 90*a* and 80*a* may be heated to the desired temperature and the pressure they apply to the sandwich of materials passing between them may be controlled to engrave and laminate continuously. This manufacturing step produces sheets of engraved and laminated first assemblies corresponding to first assembly 120*a*. Concurrently, sheets of materials corresponding to layers 102*b*, 104*b* and 106*b* are stacked one on top of the other and wrapped around a roller 800*a*. The engraved and laminated sheets outputted from rollers 80*a*/90*a* are then pressed against sheets wrapped around roller 800*a* and with rollers 800*a* and 800*b* applying requisite temperature and pressure to laminate the sheets and producing laminated assemblies of products corresponding to product 122. The resultant roll of material containing products 122 may be laminated with another sheet of material corresponding to layer 108*b* via laminating rollers 802*a*, 802*b* to produce a roll of final products corresponding to the card part shown in FIG. 4. In FIG. 6 there are 3 stages of manufacture at which different lamination steps of the manufacturing process are performed. There need be at least two stages, but here could be more than three depending on the number and types of additional layers desired to be attached to the basic first and second assemblies.

What is claimed is:

1. A method of making a hologram on a card, the card having a length, a width, a top side, top outer surface, a bottom side, and a bottom outer surface, the card consisting of a metallic foil layer sandwiched between a plurality of layers of thermoplastic materials, and optionally one or more colorants or printed features, the method comprising the steps of:
    a) forming a first assembly including a layer of metallic foil with at least a first layer of pattern-conforming material overlying and directly contacting said metallic foil, said first layer of pattern-conforming material comprising a thermoplastic which is solid at room temperature;
    b) supplying the first assembly to an inline process having at least two stages, a first stage of the inline process including passing the first assembly through a first set of rollers, thereby embossing a pattern onto said metallic foil using a laminating plate disposed underneath the metallic foil and simultaneously laminating said first assembly under pressure applied along an axis normal to a first plane defined by the length and width of the card and at a first temperature to cause portions of the first layer of pattern-conforming material to flow within and conform to the embossed portions of the metallic foil and for the metallic foil to be set to the embossed pattern, the pattern comprising rectilinear elements defined by lines orthogonal to one another in a planar section disposed normal to the first plane, said orthogonal lines including one or more first lines parallel to the normal axis and one or more second lines parallel to the first plane; and
    c) forming a second assembly including at least a second layer of pattern-conforming material, said second layer of pattern-conforming material comprising a thermoplastic which is solid at room temperature; and
    d) stacking the first and second assemblies with the second layer of pattern conforming material of the second assembly in contact with and underlying the metallic foil and, in a second stage of the inline process, passing the stacked first and second assemblies through a second set of rollers, thereby laminating the first and second assemblies under pressure and at a second temperature less than the first temperature for maintaining the setting of the embossed pattern embedded between the first and second layers of pattern-conforming material, for causing portions of the second layer of pattern-conforming material to flow within and conform to the embossed portions of the metallic foil without disturbing the embossed pattern, and for securing the first and second assemblies so they constitute all the layers of said card with the metallic foil sandwiched between the first and second pattern-conforming material layers and with the top outer surface and the bottom outer surface each having a uniformly flat disposition, wherein the optical characteristics of the metallic foil and any layers disposed between the top outer surface and the metallic foil or between the bottom outer surface and the metallic foil are selected to enable the embossed pattern to be visible from at least one of the top side or bottom side of the card.

2. A method as claimed in claim 1 including the steps of (a) preparing an engraved laminating plate with a desired pattern; and (b) applying the engraved laminating plate to the metallic foil with predetermined pressure and temperature to cause the metallic foil to conform to the engraved pattern.

3. A method as claimed in claim 1, wherein the first and second layers of pattern-conforming materials are formed from materials selected from PVC, amorphous PET including PETG, polyethylene or any thermo plastic material.

4. A method as claimed in claim 3 wherein a first additional layer of pattern-conforming material overlies the first layer of pattern-conforming material and a second additional layer of pattern-conforming material underlies the second layer of pattern-conforming material; wherein the first and second layers of pattern-conforming material are generally of the same type and thickness; and wherein the first and second additional layers are generally of the same type and thickness.

5. A method as claimed in claim 4 including a first leveling layer overlying the first additional layer and a second leveling layer underlying the second additional layer; and wherein said first and second leveling layers are generally of the same type and thickness.

6. A method as claimed in claim 5 wherein the layers between the metallic foil and the top outer surface or between the metallic foil and the bottom outer surface are formed of a clear material or include printed material.

7. A method as claimed in claim 1 wherein:
    (a) the thickness of the metallic foil ranges from 0.0005 inches to 0.003 inches; and
    (b) the thickness of the pattern-conforming layers ranges from 0.002 to 0.008 inches.

8. A method as claimed in claim 1 wherein a first additional layer of semi-conforming material overlies the first layer of pattern-conforming material and a second additional layer of semi-conforming material underlies the second layer of pattern-conforming material; wherein the first and second layers of pattern-conforming material are generally of the same type and thickness; and wherein the first and second additional layers are generally of the same type and thickness; and wherein there is also included a first leveling layer overlying the first additional layer and a second leveling layer underlying the second additional layer;

and wherein said first and second leveling layers are generally of the same type and thickness; and wherein
(a) the thickness of the semi-conforming layers ranges from 0.001 to 0.012 inches; and
(b) the thickness of the leveling layers overlying and underlying the semi-conforming layers ranges from 0.001 to 0.012 inches.

9. A method as claimed in claim 1, wherein the step of forming a second assembly includes adding a layer of semi-conforming material in front of the second layer of pattern-conforming material and a leveling layer in front of the semi-conforming layer and then laminating the first and second assemblies at a predetermined temperature which is less than the selected temperature.

10. A method of making a card as claimed in claim 1, wherein the card is formed as part of a process including;
(a) preparing an engraving plate;
(b) forming a multi-layered assembly including the layer of metallic foil on which is stacked a sheet of conformable material; and
(c) applying the engraving plate for engraving and laminating the multi layered assembly at the same time to emboss the metallic foil and form an array of first assemblies.

11. A method of forming a card as claimed in claim 1 wherein the layers of pattern-conforming material are provided as sheets of plastic materials in multiple roll laminating stations to form the assemblies and combine them in subsequent stations.

12. A method of making a card having a length and a width, the card consisting of a metallic foil layer sandwiched between a plurality of layers of thermoplastic materials, and optionally one or more colorants or printed features, the method comprising the steps of:
forming a first assembly including a layer of metallic foil and at least one layer of a first pattern-conforming material in direct contact with and overlying the metallic foil, the first pattern-conforming material comprising a solid at room temperature;
supplying the first assembly to an inline process having at least two stages, a first stage of the inline process including passing the first assembly through a first set of rollers, thereby embossing a pattern onto said layer of metallic foil and concurrently laminating the first assembly by disposing a laminating plate underneath the metallic foil and applying a first selected temperature and pressure along an axis normal to a first plane defined by the length and width of the card, causing material from the overlying layer of first pattern-conforming material to flow within embossed portions of the metallic foil for establishing the pattern and creating a three dimensional image, the pattern comprising rectilinear elements defined by lines orthogonal to one another in a planar section disposed normal to the first plane, said orthogonal lines including one or more first lines parallel to the normal axis and one or more second lines parallel to the first plane; and
forming a second assembly including at least one layer of a second pattern-conforming material and placing the second pattern-conforming layer in contact with and underlying the metallic foil, the second pattern-conforming material comprising a solid at room temperature; and
in a second stage of the inline process, passing the stacked first and second assemblies through a second set of rollers, thereby laminating the second assembly with the first assembly to secure the first and second assemblies so the embossed metallic foil containing the embossed pattern is embedded between two layers of pattern-conforming material with the top outer surface and the bottom outer surface each having a uniformly flat disposition, the laminating of said first and second assemblies performed at a lower temperature than said first selected temperature to avoid the softening and disturbance of the pattern embossed in the first assembly.

13. A method as claimed in claim 12, wherein the step of forming the first assembly includes adding layers of conforming and leveling materials to the first pattern-conforming material layer overlying the metallic foil; wherein the step of forming the second assembly includes adding layers of conforming and leveling materials to the second pattern-conforming material layer underlying the metallic foil; and wherein the overlying layers define the back of the card and the underlying layers define the front of the card.

14. A method as claimed in claim 13, wherein the optical characteristics of the metallic foil and at least one of: the overlying layers or the underlying layers are selected to enable the embossed pattern to be visible from at least one of the back or the front of the card.

\* \* \* \* \*